US010418852B2

(12) United States Patent
Hoermann

(10) Patent No.: US 10,418,852 B2
(45) Date of Patent: Sep. 17, 2019

(54) SENSOR FOR THE POSITION DETERMINATION OF A DRIVE SYSTEM

(71) Applicant: Marantec Antriebs-und Steuerungstechnik GmbH & Co. KG, Marienfeld (DE)

(72) Inventor: Michael Hoermann, Halle/Westf. (DE)

(73) Assignee: Marantec Antriebs-und Steuerungstechnik GmbH & Co. KG, Marienfeld (DE)

(*) Notice: Subject to any disclaimer, the term of this patent is extended or adjusted under 35 U.S.C. 154(b) by 27 days.

(21) Appl. No.: 15/888,833

(22) Filed: Feb. 5, 2018

(65) Prior Publication Data
US 2018/0241247 A1    Aug. 23, 2018

(30) Foreign Application Priority Data

Feb. 13, 2017  (DE) .................. 10 2017 001 386

(51) Int. Cl.
*H02J 9/06* (2006.01)
*H02J 7/00* (2006.01)
*G01D 5/14* (2006.01)
*E05F 15/603* (2015.01)

(52) U.S. Cl.
CPC ............ *H02J 9/066* (2013.01); *E05F 15/603* (2015.01); *G01D 5/145* (2013.01); *H02J 7/0063* (2013.01); *E05Y 2201/434* (2013.01); *E05Y 2400/44* (2013.01); *E05Y 2400/512* (2013.01); *E05Y 2400/614* (2013.01); *H02J 2007/0067* (2013.01)

(58) Field of Classification Search
CPC ........ G01D 5/12–2525; H02J 9/04–066; H02J 7/0063; E05F 15/60; E05F 15/603
See application file for complete search history.

(56) References Cited

U.S. PATENT DOCUMENTS

| 7,635,975 B2 | 12/2009 | Uemura et al. |
| 8,283,914 B2 | 10/2012 | Mehnert et al. |
| 9,528,856 B2 * | 12/2016 | Gehringer .............. G01D 5/145 |

(Continued)

FOREIGN PATENT DOCUMENTS

| DE | 10109186 A1 | 8/2002 |
| DE | 112005001159 T5 | 4/2007 |

(Continued)

*Primary Examiner* — Huy Q Phan
*Assistant Examiner* — David B Frederiksen
(74) *Attorney, Agent, or Firm* — McCoy Russell LLP

(57) ABSTRACT

A sensor for position determination of a drive system comprising: a magnetic sensor adapted to determine the rotational position of a magnet linked to the drive system; at least one Hall sensor to determine rotational movement and direction of rotation of the magnet; a microcontroller unit for evaluating data of the magnetic sensor and of the Hall sensor; and a rechargeable battery connected to a power supply of the sensor and that represents an alternative power supply, wherein, on a failure of the power supply, the sensor is adapted only to supply the Hall sensor and the microcontroller unit with energy from the rechargeable battery when the Hall sensor does not detect any rotational movement of the magnet and to supply at least one further component of the sensor with energy from the rechargeable battery when the Hall sensor detects a rotational movement of the magnet.

15 Claims, 1 Drawing Sheet

(56) References Cited

U.S. PATENT DOCUMENTS

| | | | |
|---|---|---|---|
| 2004/0183002 A1* | 9/2004 | Rodi | G01D 5/2492 250/231.14 |
| 2006/0016427 A1* | 1/2006 | Uda | F02D 9/1095 123/399 |
| 2011/0248709 A1* | 10/2011 | Shimizu | G01D 5/145 324/244 |
| 2013/0066587 A1* | 3/2013 | Kalathil | G01D 5/06 702/150 |

FOREIGN PATENT DOCUMENTS

| | | |
|---|---|---|
| DE | 102007062780 A1 | 7/2008 |
| DE | 102009034744 A1 | 9/2010 |

* cited by examiner

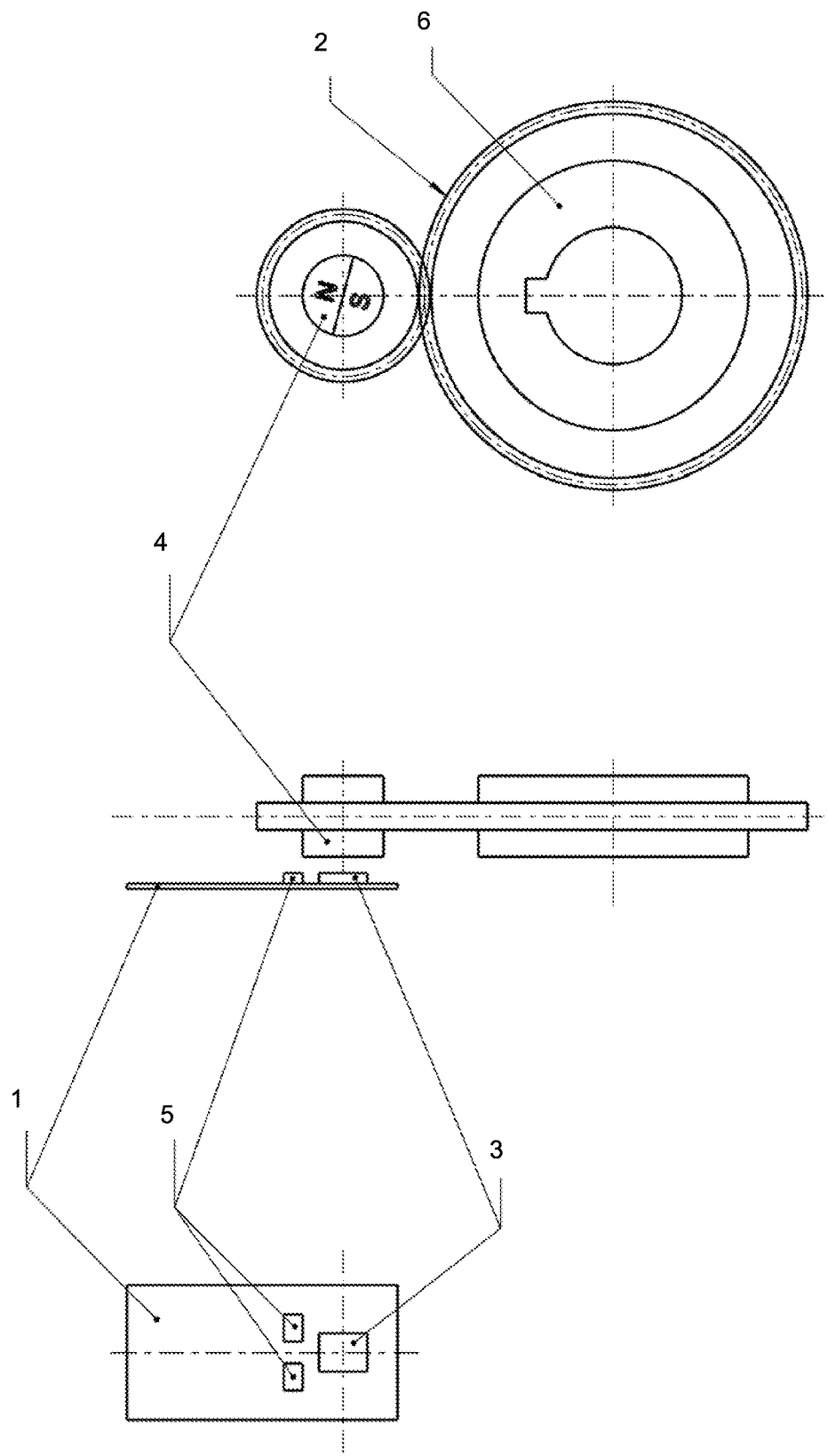

SENSOR FOR THE POSITION DETERMINATION OF A DRIVE SYSTEM

CROSS-REFERENCE TO RELATED APPLICATION

The present application claims priority to German Patent Application No. 10 2017 001 386.1, entitled "SENSOR FOR THE POSITION DETERMINATION OF A DRIVE SYSTEM" filed on Feb. 13, 2017. The entire contents of the above-listed application is hereby incorporated by reference in its entirety for all purposes.

TECHNICAL FIELD

The present invention relates to a sensor for the position determination of a drive system. This sensor is in particular suitable for the position determination for a door or gate drive such as a garage door or an access gate that are driven by such a drive system.

BACKGROUND AND SUMMARY

Such a sensor typically works on operation of the drive system. The drive system is typically supplied from an external power source so that the sensor is also supplied with power synchronously with the operation of the drive system.

On an implementation in a door or gate drive, it is of advantage for an automatic opening of the door or gate if the position of the drive system is known. The drive of the drive system is adapted to the current position of the door or gate. It is, however, possible that the automatically controllable drive systems are operated manually over a longer period of time which has the result that on a resumed automatic drive the correct position of the drive system is not available, which causes a poorer opening or closing procedure. Not only the manual actuation of the drive system, but also a power failure can, however, produce the unwanted result according to which the position determination of the drive system can no longer be unambiguously retraced.

The correct position of the drive system can only be concluded after a power failure with the aid of a single turn sensor for the case that the drive system cooperates with a shaft that performs less than one complete revolution. However, as a rule, such an arrangement requires additional components since an output shaft of the drive system typically rotates more than once about its own axis.

It is necessary for the correct determination of the position that the previously carried out revolutions of a shaft linked to the drive system are counted to obtain a correct conclusion on the position of the drive system. The correct position of the drive system should in particular also be able to be determined after a power failure even if the monitored shaft can rotate more than once about its axis.

The present invention overcomes the above-stated problems that can occur on a power failure or on an operation of the drive system by a drive system having a sensor for position determination of the drive system comprising a magnetic sensor that is adapted to determine a rotational location of a magnet linked to the drive system; at least one Hall sensor that is adapted to determine a rotational movement and a direction of rotation of the magnet so that revolutions of the magnet are countable; a microcontroller unit that is adapted to evaluate data of the magnetic sensor and of the Hall sensor and to transmit them to the drive system; and a rechargeable battery that is connected to a power supply of the sensor via an electronic charger and that represents an alternative power supply for the sensor, wherein, on a failure of the power supply, the sensor is adapted only to supply the Hall sensor and the microcontroller unit with energy from the rechargeable battery when the Hall sensor does not detect any rotational movement of the magnet and to supply at least one further component of the sensor with energy from the rechargeable battery when the Hall sensor detects the rotational movement of the magnet.

The sensor for the position determination of a drive system accordingly comprises a magnetic sensor that is adapted to determine the rotational position of a magnet linked to the drive system; at least one Hall sensor that is adapted to determine a rotational movement and a direction of rotation of the magnet so that the revolutions of the magnet are countable; a microcontroller unit that is adapted to evaluate the data of the magnetic sensor and of the Hall sensor and to transmit them to the drive system; and a rechargeable battery that is connected to a power supply of the sensor via an electronic charger and that represents an alternative power supply for the sensor, wherein, on a failure of the power supply, the sensor is adapted only to supply the Hall sensor and the microcontroller unit with energy from the rechargeable battery when the Hall sensor does not detect any rotational movement of the magnet and to supply at least one further component of the sensor with energy from the rechargeable battery when the Hall sensor detects a movement of the magnet.

It is accordingly possible on a failure of the power supply to retrace the rotational position of a magnet linked to the drive system. To save energy, the required combination of components required for determining the position of the drive system is here only supplied with power on an actual rotation of the magnet that is determined via the Hall sensor. This on the whole results in a better energy utilization of the rechargeable battery since the comparatively energy-intensive operation of the magnetic sensor is not constantly required and permits a conservation of the rechargeable battery. Only the Hall sensor is permanently supplied with power that serves as a trigger for the activation of the at least one further component of the sensor on the detection of a rotational movement of the magnet to be monitored.

In accordance with a further optional modification of the invention, the microcontroller unit is adapted to switch from a normal mode into a power saving mode (a so-called power down mode) on a failure of the power supply when the Hall sensor does not detect any rotational movement of the magnet and to exit the power saving mode and to switch into the normal state when the Hall sensor detects a rotational movement of the magnet. This feature further improves the energy efficiency since the microcontroller unit of the sensor requires a particularly small current in a state in which the magnet to be monitored, that delivers a conclusion on the position of the drive position, does not carry out any movement. The available time in which the sensor can only be operated with the energy present in the rechargeable battery is thus further extended.

Provision can be made here that the power required by the microcontroller unit is smaller than or equal to 50 µA in the power saving mode. Very long running times in rechargeable battery operation are achieved due to this small power consumption.

The sensor furthermore preferably comprises a second Hall sensor that is arranged offset from the first Hall sensor and that serves to determine the rotational movement and the direction of rotation of the magnet in a simplified manner. The at least one Hall sensor or the two Hall sensors enable(s)

a direction recognition of a rotational movement of the magnet to be monitored. The revolutions of the magnet that are required for a correct conclusion on the position of the drive system in addition to the absolute position of the magnet to be monitored are also counted with the aid of the at least one Hall sensor.

In accordance with a further development of the invention, a further component of the sensor that draws energy via the rechargeable battery on a failure of the power supply and on a detection of a rotational movement of the magnet by the Hall sensor is the magnetic sensor and/or a second Hall sensor.

The absolute rotational position or rotational location of the magnet to be monitored is determined by the supply of the magnetic sensor on a rotational movement of the magnets. In combination with the number of complete revolutions, it is now possible to draw a conclusion on the exact position of the drive system. The number of performed revolutions can here be stored in the microcontroller unit and is thus also available to the sensor after a power failure.

Provision can preferably be made that the Hall sensor is arranged offset from the magnetic sensor.

In accordance with a further development of the invention, the magnet to be monitored by the sensor is a round magnet that preferably respectively has a magnetic north pole over a range of 180° and a magnetic south pole over an adjoining range of 180°. The round magnet is accordingly frequently divided and has a magnetic south pole on the one half and a magnetic north pole on the other half.

In accordance with a further optional modification of the invention, the magnet to be monitored by the sensor rotates in dependence on an output shaft of the drive system. The rotation of the magnet to be monitored is here dependent on the rotation of the output shaft of the drive system, but can also be stepped down or stepped up with respect to the output shaft via an arrangement. A conclusion can, however, be drawn on the revolutions and on the rotational location of the output shaft and thus also on the position of the drive system through the rotation of the magnet.

Provision can furthermore be made in accordance with the invention that the components of the sensor are arranged on a circuit board. The at least one Hall sensor is preferably a super low power Hall sensor. It is also inter alia known as an ultra low power Hall sensor and has an especially low power consumption.

The invention further relates to a drive arrangement in accordance with one of the above-stated variants, in particular to a drive arrangement for driving a door or gate such as a garage door or an access gate.

Further details, features and advantages of the invention will become visible with reference to the following description of the only FIGURE.

BRIEF DESCRIPTION OF THE FIGURES

FIG. 1 shows a schematic representation of the sensor 1 and of the magnet 4 to be monitored.

DETAILED DESCRIPTION

FIG. 1 shows a plan view of the sensor 1 that is provided with two Hall sensors 5 in this embodiment on the left hand side. They are arranged offset from one another and serve to determine a rotational movement and a direction of rotation of the magnet. The magnetic sensor 3 that is able to determine the absolute rotational location of a magnet 4 linked to the drive system 2 is arranged offset from the two Hall sensors 5. The Hall sensors 5 serve the counting of the revolutions of the magnet 4 and the recognition of the direction of rotation.

The interaction of the sensor 1 with the magnet 4 to be monitored that is linked to the drive system is shown in the middle region of FIG. 1. For this purpose, the magnet 4 whose rotation is to be monitored is arranged above the magnetic sensor 3 so that the magnet 4 can interact with the magnetic sensor 3 and the Hall sensors of the sensor 1 for the position determination of the drive system 2. For this purpose, the magnet 4 is brought into spatial proximity with the components of the sensor 1 that depends on the strength of the magnet 4 in which the magnetic field interacts with the sensor 1 with sufficient strength.

The right hand side of this FIGURE shows one of a plurality of possibilities of linking the magnet 4 to an output shaft 6 of the drive system. A toothed arrangement was selected in the present case that establishes a connection between the output shaft 6 and the magnet 4. The meshing toothed connection provides that, on a rotation of the output shaft, a rotation of the magnet is likewise carried out. Since the revolutions of the magnet 4 can be retraced with the aid of the Hall sensors 5, it is not necessary to restrict the magnet with the aid of a transmission or of another arrangement to a movement of less than or equal to 360° (for a measurement with so-called single turn sensors in which the magnet to be monitored rotates by a maximum of 360°).

The magnetic sensor recognizes the position within a complete revolution of the magnet; it can therefore resolve the absolute position of the magnet within 360°. The at least one Hall sensor 5 allows a directional recognition or a rotational movement of the magnet 4 and also serves the recognition of the complete revolutions of the magnet. The presence of a plurality of Hall sensors 5 simplifies this recognition. The Hall sensors furthermore serve to count the revolutions of the magnet and can be designed in accordance with an advantageous embodiment by super low power Hall sensors with which a power supply can be maintained for an especially long time with the aid of the rechargeable battery in a voltage-less state. To reduce an unnecessary strain on the rechargeable battery, the magnetic sensor 3 is switched off and the microcontroller unit can additionally be switched to a power saving mode. The standby current is thereby reduced to approximately 50 µA, whereby extremely long rechargeable battery running times are made possible. If the Hall sensor supplied with power recognizes a rotational movement of the round magnet 4, the microcontroller unit is taken out of the power saving state again to enable a correct determination of the position of the drive system. If the supply voltage is present again, the rechargeable battery is charged and the system remains active.

Voltage-free states can be bridged over a particularly long time period with the aid of the present invention without a loss of the position of the drive system taking place even though the position of the drive means is changed manually or in another manner within the voltage-free state.

A transmission means that transmits data between the sensor 1 and the drive system 2 is not shown in the FIGURE. Three transmission modes are present for this communication that differ in their Baud rates. Baud rates of 9600 and 19,200 are, for example, available with the Kostal protocol, with a new multi turn protocol being able to be transmitted at a Baud rate of 115,200.

The invention claimed is:

1. A sensor for position determination of a drive system comprising:

a magnetic sensor that is adapted to determine a rotational location of a magnet linked to the drive system;

at least one Hall sensor that is adapted to determine a rotational movement and a direction of rotation of the magnet so that revolutions of the magnet are countable;

a microcontroller unit that is adapted to evaluate data of the magnetic sensor and of the Hall sensor and to transmit them to the drive system; and a rechargeable battery that is connected to a power supply of the sensor via an electronic charger and that represents an alternative power supply for the sensor, wherein, on a failure of the power supply, the sensor is adapted only to supply the Hall sensor and the microcontroller unit with energy from the rechargeable battery when the Hall sensor does not detect any rotational movement of the magnet and to supply at least one further component of the sensor with energy from the rechargeable battery when the Hall sensor detects the rotational movement of the magnet.

2. The sensor in accordance with claim 1, wherein the microcontroller unit is adapted to switch into a power saving mode on the failure of the power supply when the Hall sensor does not detect any rotational movement of the magnet and to exit the power saving mode when the Hall sensor detects the rotational movement of the magnet.

3. The sensor in accordance with claim 2, wherein the power required by the microcontroller unit in the power saving mode is smaller than or equal to 50 µA.

4. The sensor in accordance with claim 3, wherein the Hall sensor is arranged offset from the magnetic sensor, and wherein the magnet is a round magnet that has a magnetic north pole and a magnetic south pole over respective ranges of 180°.

5. The sensor in accordance with claim 2, further comprising a second Hall sensor that is arranged offset from the first Hall sensor and that serves to determine the rotational movement and the direction of rotation of the magnet in a simplified manner.

6. The sensor in accordance with claim 1, further comprising a second Hall sensor that is arranged offset from the first Hall sensor and that serves to determine the rotational movement and the direction of rotation of the magnet in a simplified manner.

7. The sensor in accordance with claim 6, wherein a further component of the sensor that draws energy via the rechargeable battery on a failure of the power supply and when the Hall sensor detects a rotational movement of the magnet is the magnetic sensor and/or the second Hall sensor.

8. The sensor in accordance with one claim 1, wherein the Hall sensor is arranged offset from the magnetic sensor.

9. The sensor in accordance with claim 1, wherein the magnet is a round magnet that has a magnetic north pole and a magnetic south pole over respective ranges of 180°.

10. The sensor in accordance with claim 1, wherein the magnet rotates in accordance with an output shaft of the drive system.

11. The sensor in accordance with claim 1, wherein the components of the sensor are arranged on a circuit board.

12. The sensor in accordance with claim 1, wherein the at least one Hall sensor is a super low power Hall sensor.

13. A drive arrangement for driving a door or gate, having a sensor for position determination of a drive system comprising:

a magnetic sensor that is adapted to determine a rotational location of a magnet linked to the drive system;

at least one Hall sensor that is adapted to determine a rotational movement and a direction of rotation of the magnet so that revolutions of the magnet are countable;

a microcontroller unit that is adapted to evaluate data of the magnetic sensor and of the Hall sensor and to transmit them to the drive system; and a rechargeable battery that is connected to a power supply of the sensor via an electronic charger and that represents an alternative power supply for the sensor, wherein, on a failure of the power supply, the sensor is adapted only to supply the Hall sensor and the microcontroller unit with energy from the rechargeable battery when the Hall sensor does not detect any rotational movement of the magnet and to supply at least one further component of the sensor with energy from the rechargeable battery when the Hall sensor detects the rotational movement of the magnet.

14. The drive arrangement in accordance with claim 13, wherein the door or gate is a garage door or an access gate.

15. The drive arrangement in accordance with claim 13, wherein the microcontroller unit is adapted to switch into a power saving mode on the failure of the power supply when the Hall sensor does not detect any rotational movement of the magnet and to exit the power saving mode when the Hall sensor detects the rotational movement of the magnet; and wherein the power required by the microcontroller unit in the power saving mode is smaller than or equal to 50 µA.

* * * * *